(12) United States Patent
Bushnell

(10) Patent No.: US 6,592,346 B2
(45) Date of Patent: Jul. 15, 2003

(54) COMPRESSOR DISCHARGE VALVE

(75) Inventor: Paul J. Bushnell, Syracuse, NY (US)

(73) Assignee: Carrier Corporation, Syracuse, NY (US)

( * ) Notice: Subject to any disclaimer, the term of this patent is extended or adjusted under 35 U.S.C. 154(b) by 0 days.

(21) Appl. No.: 09/978,235

(22) Filed: Oct. 16, 2001

(65) Prior Publication Data

US 2003/0072664 A1 Apr. 17, 2003

(51) Int. Cl.[7] ................................. F03C 2/00
(52) U.S. Cl. .................. 418/63; 418/270; 137/856; 137/855; 137/857; 137/858
(58) Field of Search ................ 418/63, 270; 137/855, 137/856, 857, 858

(56) References Cited

U.S. PATENT DOCUMENTS

| 4,580,604 A | | 4/1986 | Kawaguchi et al. | |
|---|---|---|---|---|
| 4,668,172 A | * | 5/1987 | Shibuya et al. | 137/856 |
| 4,955,797 A | * | 9/1990 | Cowen | 137/856 |
| 5,775,894 A | | 7/1998 | Kosco, Jr. | |
| 5,921,273 A | * | 7/1999 | Ono et al. | 137/856 |
| 6,027,321 A | * | 2/2000 | Shim et al. | 418/270 |
| 6,176,687 B1 | * | 1/2001 | Kim et al. | 137/855 |

FOREIGN PATENT DOCUMENTS

| GB | 847513 A1 | * | 9/1960 | 135/855 |
|---|---|---|---|---|
| JP | 60-008577 A1 | * | 1/1985 | 135/855 |
| JP | 60-093194 | * | 5/1985 | 418/63 |

* cited by examiner

Primary Examiner—Thomas Denion
Assistant Examiner—Theresa Trieu
(74) Attorney, Agent, or Firm—William F. White

(57) ABSTRACT

A compressor includes a particularly shaped discharge valve which extends into the discharge port. The shaped valve includes a convex portion on the seat side of the valve which extends downwardly into the discharge port. The shaped valve furthermore includes a concave portion on the seat side of the valve that begins where the convex portion ends. The beginning of the concave portion on the seat side of the valve is located so as to prevent flow separation of the refrigerant when flowing along the convex portion of the valve as it leaves the compression chamber of the compressor.

6 Claims, 5 Drawing Sheets

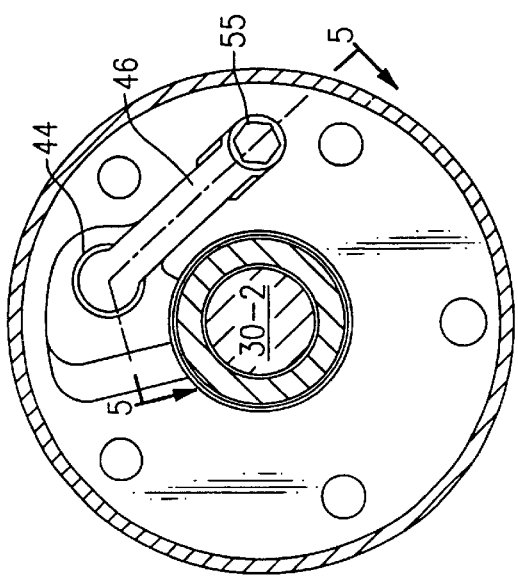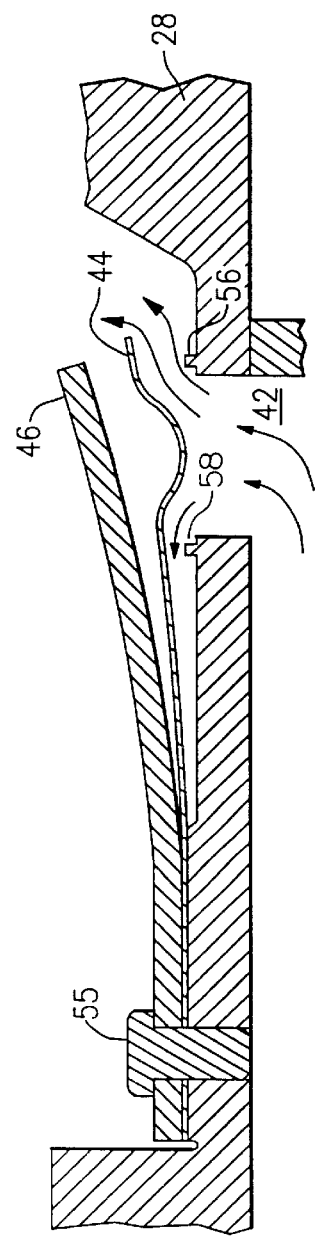

COMPRESSOR DISCHARGE VALVE

FIELD OF THE INVENTION

The present invention relates to refrigerant compressors, and more particularly to discharge valve assemblies for such compressors.

DESCRIPTION OF RELATED ART

There are various types of refrigerant compressors which perform the function of compressing refrigerant fluids. These include reciprocating compressors, rotary compressors, and scroll compressors.

Reciprocating compressors include at least one cylinder with a piston reciprocating therein so as to both draw fluid into the cylinder and thereafter compress the fluid before discharge. Such a compressor requires a means for regulating both the inflow and outflow of the fluid to and from the cylinder.

A rotary type refrigerant compressor typically includes a roller or piston, which rotates or orbits within a cylinder in such a manner so as to define a compression chamber and a suction chamber. The rotary piston rotates beyond a top dead center position to a point where the compression chamber is at a maximum volume. As the rotary piston rotates beyond the top dead center position, it begins to compress refrigerant fluid contained in the compression chamber. This compression of the refrigerant fluid continues until just prior to the top dead center position where the compression chamber is now adding minimum volume. It is necessary to provide a means for regulating the inflow and outflow of the fluid to and from the cylinder within the rotary type refrigerant compressor also.

A discharge valve is normally used to regulate the outflow of compressed fluid in both reciprocating and rotary compressors. The discharge valve is in communication with the compressor chamber provided in a cylinder head of the rotary compressor or in a valve plate adjacent the cylinder in a reciprocating type compressor. The discharge valve may be of the flat leaf spring-type in either compressor. Typically in a rotary compressor, the flat leaf spring-type valve is biased toward a valve seat while a volume of fluid is compressed with increasing force within the compression chamber. At a certain point, the force becomes sufficient to overcome the biasing of the leaf spring, thereby causing the valve member to become unseated so as to allow compressed refrigerant fluid to enter a discharge chamber.

A problem with such leaf spring valve members has been that they do not extend into the discharge port. This results in a volume of fluid in the discharge port which re-expands in the cylinder during the next cycle of suction.

Various valve arrangements have been devised which extend into the discharge port so as to thereby reduce the re-expansion volume. An example of such is found in U.S. Pat. No. 5,775,894, which discloses a rotary-type compressor with a discharge valve having a discharge ball which is biased against the discharge port. This particular discharge valve arrangement requires both a discharge ball and a separate discharge valve stem as well as a machined valve seat to accommodate the spherical ball. Another example of a discharge valve device is disclosed in U.S. Pat. No. 4,580,604. This patent discloses a discharge valve having an elliptical curved cross section, which extends into the valve port. This valve assembly also requires a machined valve seat so as to conform to the elliptical shape of the valve.

A problem with the above described discharge valves is that flow separation occurs at some point along the curved portion of the valve when compressed refrigerant flows out of the discharge port. This tends to decrease the overall effective clearance volume between the valve and the valve seat. It moreover produces a certain amount of kinetic energy formed at the point of flow separation, which can produce an unacceptable noise level when the valve opens.

SUMMARY OF THE INVENTION

The present invention provides a shaped valve which extends into the discharge port so as to reduce the re-expansion volume. The shaped valve includes a convex portion on the seat side of the valve which extends downwardly into the discharge port. The shaped valve furthermore includes a concave portion on the seat side of the valve that begins where the convex portion ends. The beginning of the concave portion on the seat side of the valve is located so as to prevent flow separation of the refrigerant when flowing along the convex portion of the valve as it leaves the compression chamber of the compressor. The beginning of the concave portion can be defined by a radius measured from the centerline of the discharge port to the circumference of a circle defining where the convex portion ends or the concave portion begins. This radius is greater than one-half of an inside radius as measured from the centerline of the discharge port to the innermost point of contact of the valve seat with the seat side of the valve.

BRIEF DESCRIPTION OF THE DRAWINGS

For a fuller understanding of the present invention, reference should now be made to the following detailed description thereof in conjunction with the accompanying drawings, wherein:

FIG. 4 is a sectional view taken along line 4—4 of FIG. 3;

FIG. 5 is a sectional view taken along line 5—5 of FIG. 4;

DESCRIPTION OF THE PREFERRED EMBODIMENT

Figure 1:
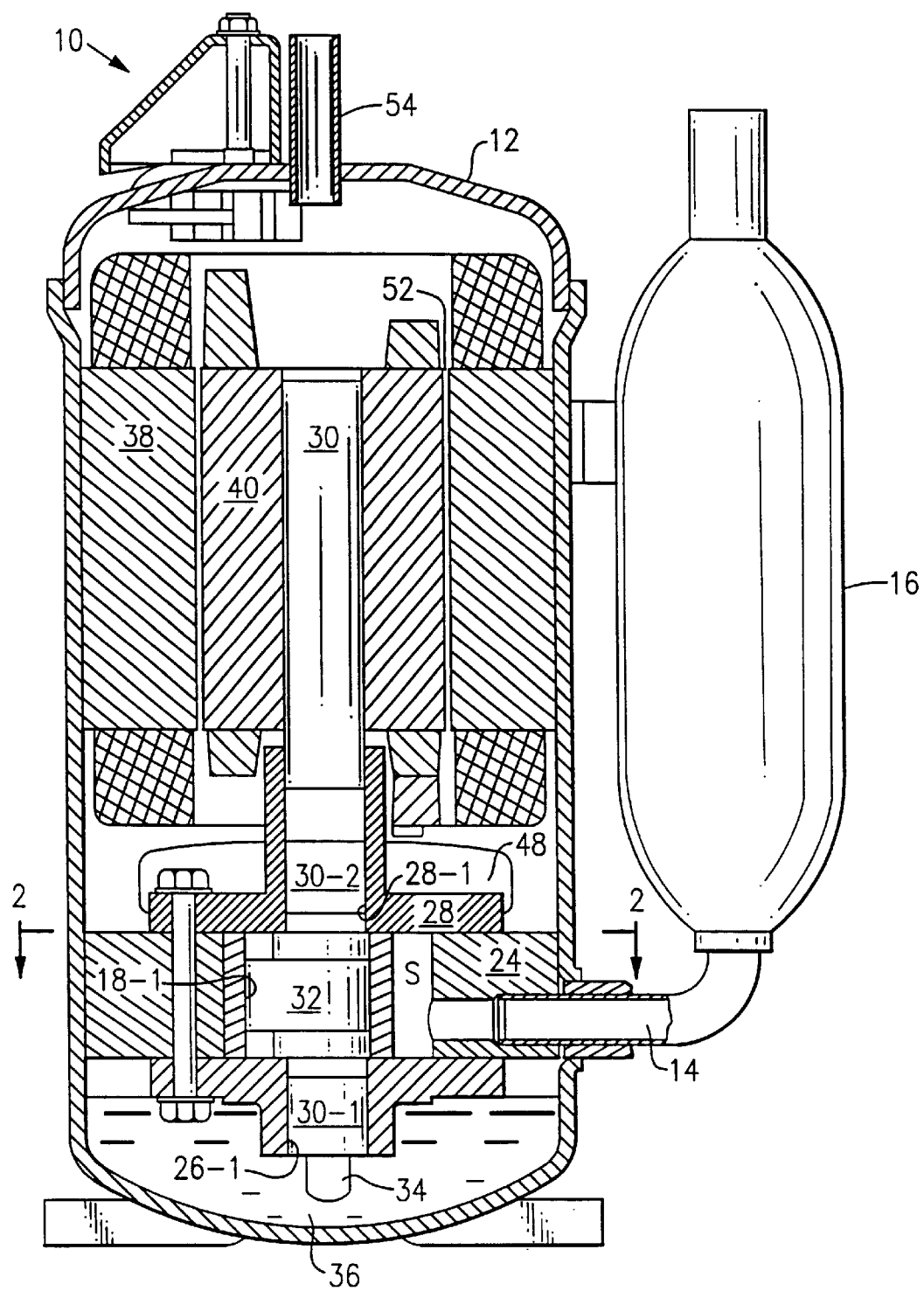
FIG. 1 is a vertical sectional view of a rolling piston compressor taken through the suction structure.
Figure 2:
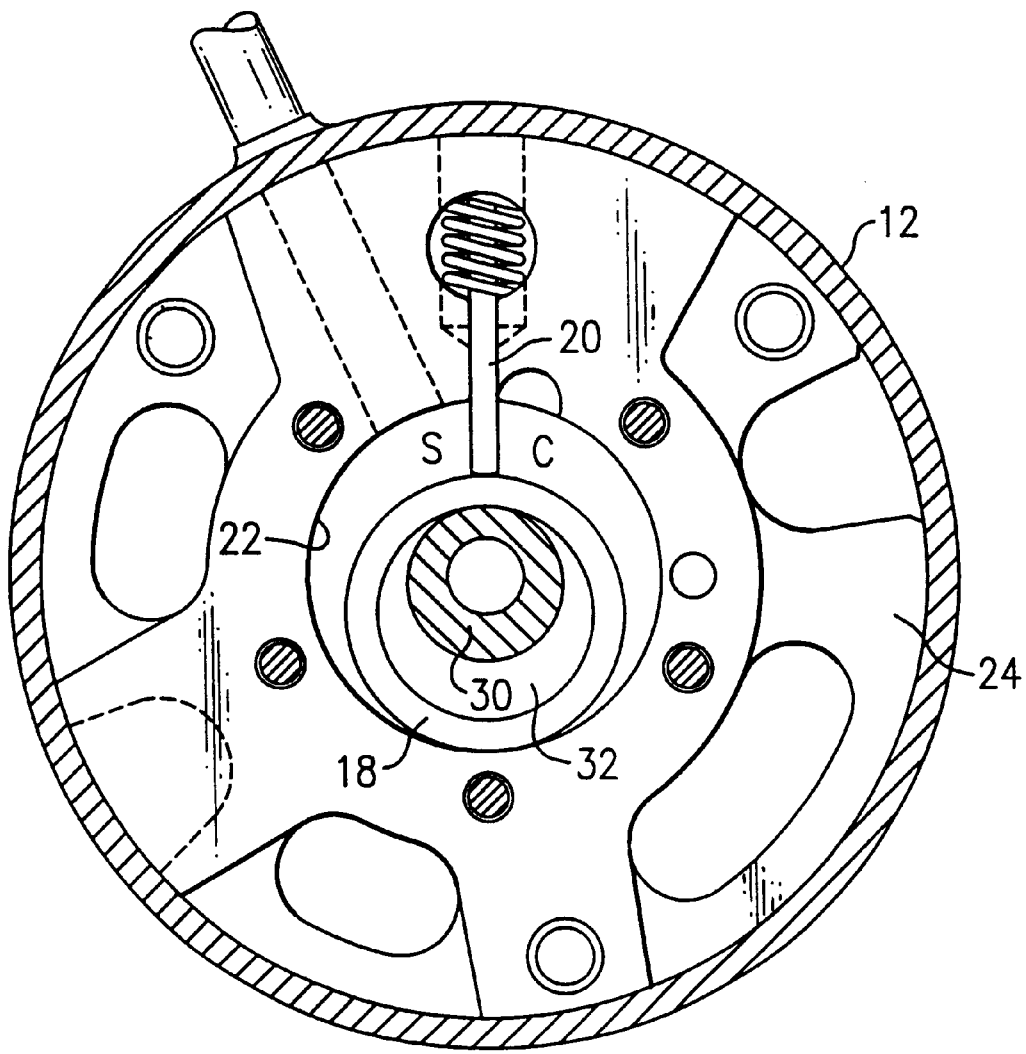
FIG. 2 is a sectional view taken along line 2—2 in FIG. 1.

Referring now to the drawings and, in particular, to FIG. 1, a rolling piston compressor 10 is shown to have a housing or shell 12. A suction tube 14 is sealed to the shell 12 so as to provide a fluid connection between a suction accumulator 16 and a suction chamber S. Referring to FIG. 2, the suction chamber S is defined by a piston 18, a guide vane 20, and a bore 22 within a cylinder 24. Referring again to FIG. 1, the suction chamber S is furthermore defined by a pump end bearing 26 and a motor end bearing 28.

An eccentric shaft 30 includes a portion 30-1, which is supportingly received in a bore 26-1 of the pump end bearing 26. Another portion 30-2 of the eccentric shaft 30 is supportingly received in a bore 28-1 of the motor end bearing 28. Furthermore, an eccentric 32 is received in a bore 18-1 of piston 18. An oil pick up tube 34 extends into sump 36 from a bore in portion 30-1 of eccentric shaft 30.

The eccentric shaft 30 is driven by an electric motor within the housing 12. The motor comprises a stator 38 secured to the housing or shell 12 by shrink fit welding or any other suitable means. A rotor 40 of the motor is located within bore 38-1 of stator 38 and is suitably secured to the shaft 30 by a shrink fit.

Figure 3:
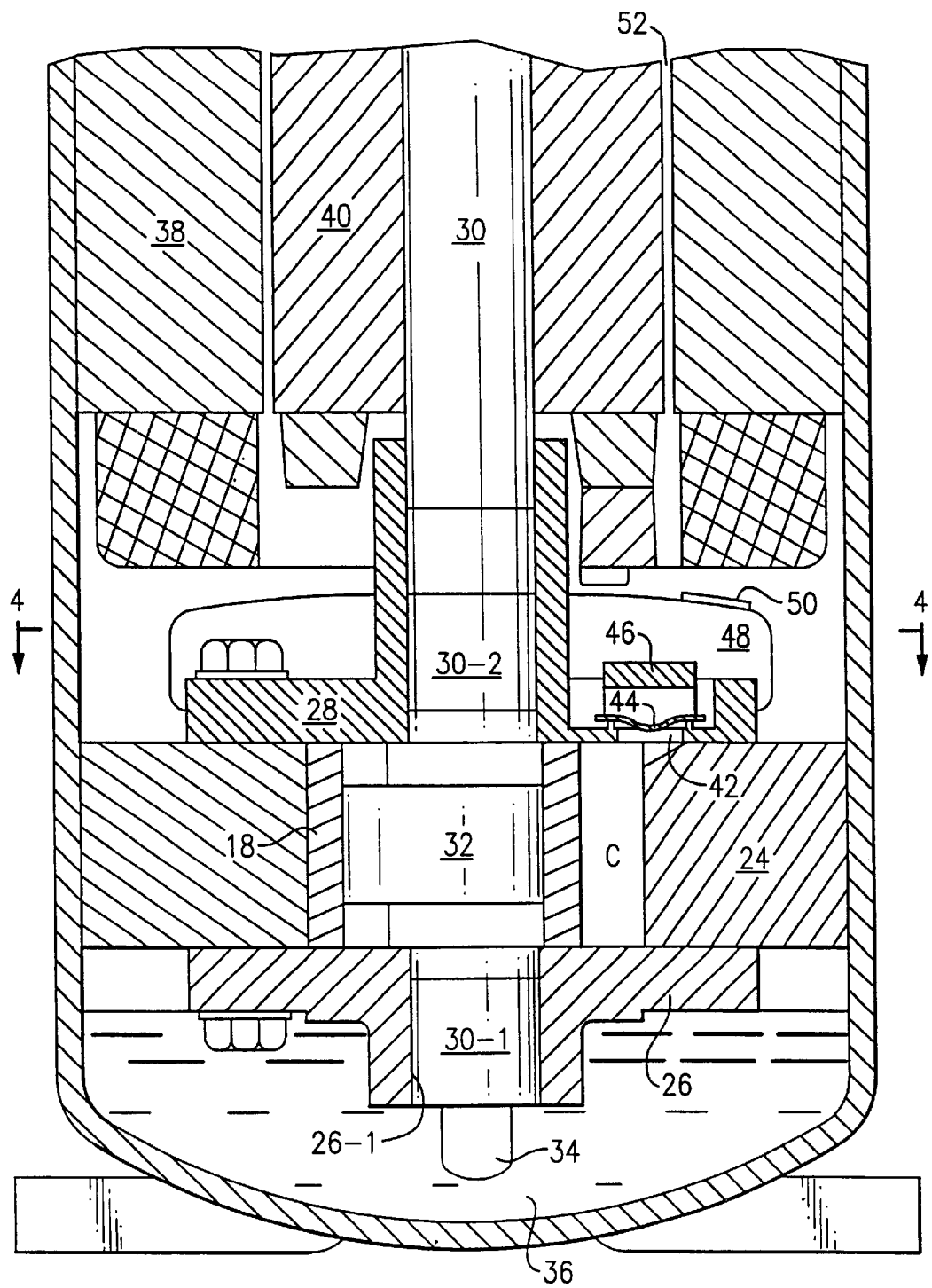
FIG. 3 is a partial vertical sectional view of a rolling piston compressor corresponding to that of FIG. 1 taken through the discharge structure.

Referring to FIG. 3, the compression chamber, C, of the bore 22 within cylinder 24 is clearly illustrated. A discharge port 42 formed in motor end bearing 28 is seen to partially overlie the compression chamber C. A discharge valve 44 overlays the discharge port 42 in FIG. 3 so as to prevent the compressed refrigerant from exiting the discharge port. A valve stop 46 is spaced from the discharge valve 44 in a conventional manner so as to define the limits of the open position of the discharge valve 44.

The refrigerant gas in the. compression chamber. C ultimately reaches a high pressure which unseats the valve 44 so as to cause the gas in the chamber C to pass through the discharge port 42 and into the interior of a muffler 48 formed on the top of the motor end bearing 28. The compressed gas passes through holes such as 50 in the muffler 48 into the interior of the housing 12 and passes via an annular gap 52 between the rotating rotor 40 and stator 38 and then through a discharge line 54, as shown in FIG. 1. The thus released high pressure gas proceeds to a condenser in a refrigeration circuit, which is not shown.

Referring now to FIG. 4, the position of the valve stop 46 is illustrated relative to the motor end bearing 28. The valve 44 is for the most part underneath the valve stop except for a small peripheral portion of the valve that extends out from underneath the valve stop. It is to be noted that the valve 44 is preferably circular in this area underneath the valve stop with a radius slightly greater than the radius of the valve stop. The valve stop and underlying valve both include stems anchored to the bearing 28 by a bolt 55.

Referring now to FIG. 5, the discharge valve 44 is shown in an open position relative to a valve seat 56 formed in the motor end bearing 28. Refrigerant flowing through the discharge port 42 tends to be diverted by the shape of the valve 44. In particular, the refrigerant flow follows the curvature of the valve 44 before passing past the tip of the valve.

Figure 6:
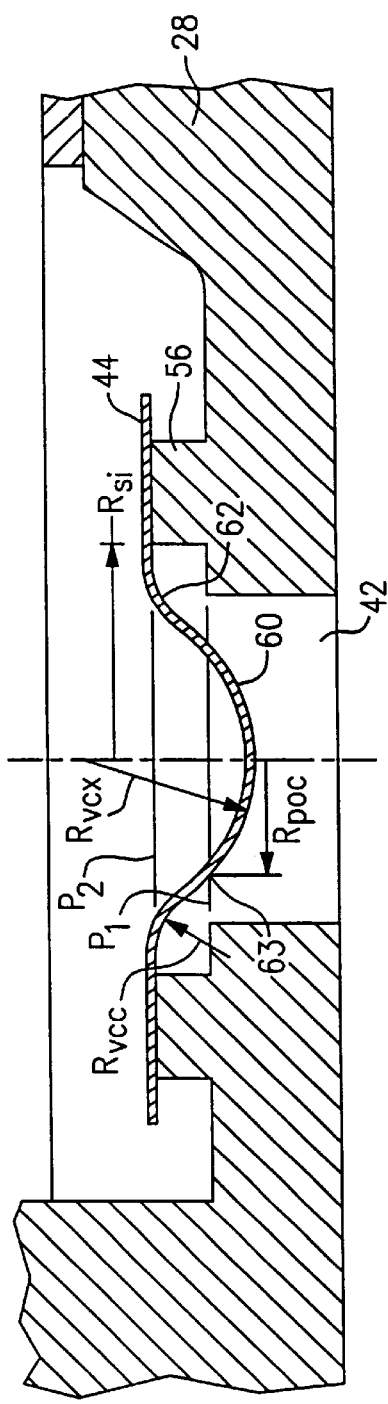
FIG. 6 is an enlarged view of a discharge valve within the rolling piston compressor shown in FIG. 3.

Referring now to FIG. 6. the curved shape of the discharge valve is shown in further detail. The valve 44 is shown in a closed position in FIG. 6 in much the same way it is shown in FIG. 3. In this regard, the valve 44 rests on the valve seat 56 formed in the motor end bearing 28. The valve seat 56 is preferably formed by a circular counter-bore 58 in the motor end bearing 28 above the discharge port 42. This counter-bore accommodates the curvature of the valve as will now be described.

The shaped portion of the valve 44 begins with a convex portion 60 on the seat side of the valve, which extends downwardly into the discharge port 42. The average integrated radius of curvature of the seat side of the convex portion 60 is denoted as $R_{VCX}$. The convex portion 60 is followed by a concave portion 62 on the seat side of the valve. The average integrated radius of curvature of the seat side of the concave portion 62 is denoted as $R_{VCC}$. The beginning of the concave portion 62 on the seat side of the valve is defined by a circle having a radius $R_{POC}$ lying in a plane $P_1$. The center for this radius is defined by where the center line of the discharge port 46 and valve seat 56 intersects plane $P_1$. It is to be understood that the circle defined by the radius $R_{POC}$ in the plane $P_1$ defines a point of contraflexure 63 in FIG. 6. This point of contraflexure is however just one of many points of contraflexure lying on the circumference of the aforementioned circle. The length of the radius $R_{POC}$ is preferably defined relative to an inside radius $R_{SI}$ lying in a plane $P_2$ defining the first or innermost circle of contact of the circular seat 56 with the seat side of the valve 44. It is to be understood that the innermost point of contact in FIG. 6 is just one point of contact lying on the circumference of the aforementioned circle . The radius $R_{POC}$ is preferably greater than one-half of the inside seat radius $R_{SI}$ and less than the full length of the inside radius $R_{SI}$. Furthermore, the average radius of curvature $R_{VCC}$ of the seat side of the concave portion 54 is less than the average radius of curvature $R_{VCX}$ of the seat side of the convex portion 60. This allows for a smooth change of curvature so as to form a flow pattern such as is shown in FIG. 5.

Figure 7:
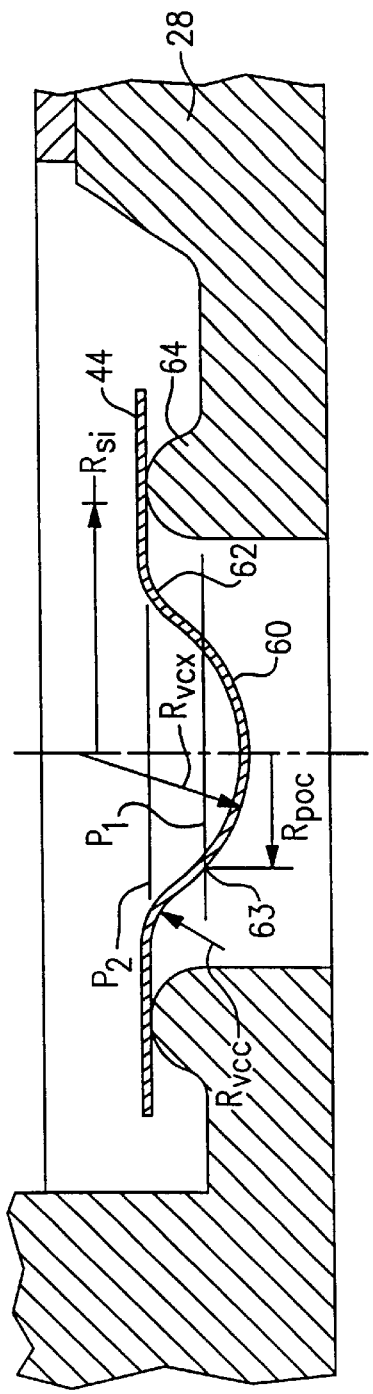
FIG. 7 is a view corresponding to FIG. 6 showing a modified embodiment of the invention.

Referring now to FIG. 7, an alternative valve seat 64 is illustrated relative to the shaped valve stem 44. In particular, the valve seat 64 is a rounded valve seat so as to provide the clearance for the valve shape 44 when it moves to an open position. The inside radius $R_{SI}$ of the valve seat 64 is in this case the rounded point of contact with the seat side of the valve 44.

It is to be appreciated that a preferred embodiment of a discharge valve within a vertical rolling piston compressor has been disclosed. Alterations and modifications may be made to the thus disclosed valve within a rolling piston compressor without departing from the scope of the invention. For instance, although the invention has been illustrated and described in terms of a vertical rolling piston compressor, the invention is believed to be applicable to any compressor having a discharge valve. Furthermore, the valve 44 need not be formed from a single piece of material and stamped so as to form the convex and concave portions. In this regard, the convex and concave portions could be formed from a single solid piece that would merely fit into a hole in much the same manner as the spherical ball does in U.S. Pat. No. 5,775,894. Also, the convex and concave portions of the valve 44 could have cylindrical radii of curvature so as to fit into a valve seat that was either square or rectangular instead of circular. In this later case, the radius $R_{POC}$ and the radius $R_{SI}$ would be replaced with appropriate distances to the perimeter of the points of contraflexure or the innermost points of contact with the valve seat. It is therefore intended that the present invention be limited only by the scope of the appended claims.

What is claimed is:

1. A rotary compressor comprising:
   a shell having a fit end and a second end;
   a cylinder having a bore containing pump structure including a vane and a piston coacting with said cylinder to define suction and compression chambers;
   said cylinder being fixedly located in said shell near said first end;
   a first bearing underlying said bore and secured to said cylinder and extending towards said first end;
   a second bearing secured to said cylinder, overlying said bore and extending towards said second end;
   a motor including a rotor and a stator;
   said stator being fixedly located in said shell between said cylinder and said second end and axially spaced from said cylinder and said second bearing;

an eccentric shaft supported by said first and second bearings and including an eccentric operatively connected to said piston;

said rotor secured to said shaft so as to be integral therewith and located within said stator so as to define therewith an annular gap;

means for supplying gas to said pump structure;

a discharge fluidly connected to said shell;

a discharge port located in said second bearing;

a valve overlying said discharge port; and said valve having a first end being secured to said second bearing so as to permit flexure of said valve and a second end coacting with said discharge port to control flow therethrough, wherein said second end coacting with said discharge port includes a convex shaped portion which extends into said discharge port when said second end is prohibiting flow through the discharge port and wherein said convex shaped portion merges into a concave shaped portion before any contact by the second end with a valve seat formed in said second bearing when said second end is prohibiting flow through the discharge port and wherein the valve seat formed in said second bearing is substantially circular and wherein the contact by the second end with the valve seat is a circular contact having a radius located in a first plane defined by the circular contact and wherein said convex shaped portion merges into said concave portion at points of contraflexure located on the circumference of a circle, said circle containing said points of contraflexure having a radius in a second plane defined by said points of contraflexure, said radius in said second plane being greater than one-half of said radius in said first plane.

2. The compressor of claim 1 wherein the convex shaped portion has a first average integrated radius of curvature and said concave shaped portion has a second average integrated radius of curvature which is less than the first average integrated radius of curvature.

3. The compressor of claim 1 wherein the valve seat comprises a raised circular ring and wherein the inside radius of the raised circular ring is greater than the inside radius of at least part of said discharge port.

4. In a compressor having a discharge port for discharging compressed gas from a chamber in which the gas is compressed, a discharge valve which overlays a valve seat associated with said discharge port, said discharge valve coacting with said discharge port so as to control the flow of compressed gas there through, wherein said discharge valve includes a convex shaped portion which extends into said discharge port when said discharge valve is prohibiting flow through the discharge port and wherein said convex shaped portion merges into a concave shaped portion before any contact with the valve seat associated with said discharge port when said valve is prohibiting flow through the discharge port and wherein the valve seat is substantially circular and wherein the contact by the valve with the valve seat is a circular contact having a radius located in a first plane defined by the circular contact and wherein said convex shaped portion merges into said concave portion at points of contraflexure located on the circumference of a circle, said circle containing said points of contraflexure having a radius in a second plane defined by said points of contraflexure, said radius in said second plane being greater than one-half of said radius in said first plane.

5. The compressor of claim 4 wherein the convex shaped portion has a first average integrated radius of curvature and said concave shaped portion has a second average integrated radius of curvature which is less than the first average integrated radius of curvature.

6. The compressor of claim 4 wherein the valve seat comprises a raised circular ring and wherein the inside radius of the raised circular ring is greater than the inside radius of at least part of said discharge port.

\* \* \* \* \*